(12) United States Patent
Hiroishi et al.

(10) Patent No.: US 6,766,087 B2
(45) Date of Patent: Jul. 20, 2004

(54) NONLINEAR DISPERSION-SHIFTED OPTICAL FIBER, OPTICAL SIGNAL PROCESSING APPARATUS USING SAID OPTICAL FIBER AND WAVELENGTH CONVERTER USING SAID OPTICAL FIBER

(75) Inventors: Jiro Hiroishi, Tokyo (JP); Naomi Kumano, Tokyo (JP); Ryuichi Sugizaki, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 10/262,957

(22) Filed: Oct. 3, 2002

(65) Prior Publication Data
US 2003/0095767 A1 May 22, 2003

(30) Foreign Application Priority Data

Oct. 4, 2001 (JP) ................................. 2001-308931
Oct. 4, 2001 (JP) ................................. 2001-308932
Mar. 25, 2002 (JP) ................................. 2002-084215

(51) Int. Cl.$^7$ ............................. G02B 6/00; H04J 14/02
(52) U.S. Cl. ..................... 385/122; 385/123; 385/124; 385/126; 398/81
(58) Field of Search ..................... 385/122, 123, 385/124, 126, 127, 141, 125, 128; 398/81

(56) References Cited

U.S. PATENT DOCUMENTS 5,694,239 A * 12/1997 Shigematsu et al. ........ 359/332
6,317,238 B1 * 11/2001 Bergano et al. ............... 398/81
6,347,174 B1    2/2002 Onishi et al. ................ 385/123
6,594,428 B1 *  7/2003 Tanaka et al. ............... 385/123
2002/0057880 A1 5/2002 Hirano et al. ............... 385/123

FOREIGN PATENT DOCUMENTS

WO    WO 99/10770    3/1999    ............. 385/123 X

OTHER PUBLICATIONS

Hiroishi et. al., "Non–Linear Dispersion–Shifted Optical Fiber . . .", U.S. Pub. No. U.S. 2003/0095767 A1, published May 22, 2003.*
Watanabe, "Optical Communications system . . .", U.S. Pub. No. 2002/0114048A1, published Aug. 22, 2002.*
J. Hiroishi, et al., 7$^{th}$ OptoElectronics and Communications Conference, pp. 492–493, "Highly Nonlinear DSF with Low Dispersion Slope for Wavelength Converter", Jul. 8–12, 2002.

* cited by examiner

Primary Examiner—Brian M. Healy
(74) Attorney, Agent, or Firm—Oblon, Spivak, McClelland, Maier & Neustadt, P.C.

(57) ABSTRACT

Disclosed is a nonlinear dispersion-shifted optical fiber, wherein a charomatic dispersion at a wavelength of 1550 nm is equal to a set value required for optical signal processing utilizing a nonlinear phenomenon, a dispersion slope at a wavelength of 1550 nm falls within a range of 0.001 to 0.1 ps/nm$^2$/km, a margin of fluctuation of the charomatic dispersion in a longitudinal direction of the optical fiber at a wavelength of 1550 nm falls within a range of 0.01 to 3 ps/nm/km, and a nonlinear constant $n_2/A_{eff}$ at a wavelength of 1550 nm is not smaller than $15\times10^{-10}$/W.

45 Claims, 2 Drawing Sheets

NONLINEAR DISPERSION-SHIFTED OPTICAL FIBER, OPTICAL SIGNAL PROCESSING APPARATUS USING SAID OPTICAL FIBER AND WAVELENGTH CONVERTER USING SAID OPTICAL FIBER

CROSS-REFERENCE TO RELATED APPLICATIONS

This application is based upon and claims the benefit of priority from the prior Japanese Patent Applications No. 2001-308931, filed Oct. 4, 2001; No. 2001-308932, filed Oct. 4, 2001; and No. 2002-084215, filed Mar. 25, 2002, the entire contents of all of which are incorporated herein by reference.

BACKGROUND OF THE INVENTION

1. Field of the Invention

The present invention relates to a nonlinear dispersion-shifted optical fiber generating a nonlinear optical phenomenon relative to input light as well as an optical signal processing apparatus and a wavelength converter each using the particular optical fiber.

2. Description of the Related Art

The nonlinear optical phenomena that can take place within an optical fiber include, for example, four wave mixing, self phase modulation, cross phase modulation, and stimulated Brillouin scattering. If these phenomena take place within an optical fiber, wavelength conversion, phase modulation, scattering, etc., are generated, increasing the noise component or inhibiting a sufficient transmission of the input light. Such being the situation, it was attempted to exclude these nonlinear optical phenomena as much as possible in a conventional optical fiber for transmission.

In recent years, the conventional concept has been changed so as to carry out wavelength conversion, in which the wavelength of an optical signal is changed from the long wavelength side toward the short wavelength side, and optical signal processing such as waveform correction for correcting the distortion of the waveform of the optical signal by positively utilizing nonlinear optical phenomena.

However, since it was attempted to exclude nonlinear optical phenomena as much as possible in the past, as described above, it is impossible to obtain an optical fiber suitable for carrying out optical signal processing such as wavelength conversion by positively utilizing nonlinear optical phenomena.

A nonlinear optical fiber for carrying out wavelength conversion is disclosed in, for example, Re-published Patent No. WO 99/10770. However, the nonlinear optical fiber disclosed in this prior art is not necessarily sufficient. For example, it has been clarified that, if it is intended to increase the nonlinearity, it is difficult to adjust the chromatic dispersion, making it difficult to manufacture the optical fiber.

Also, in order to utilize positively the nonlinear optical phenomena of the optical fiber, it is desirable for the optical fiber to have a desired dispersion value at the wavelength of the input light. Particularly, in order to utilize wavelength conversion, it is desirable for the optical fiber to have a zero dispersion wavelength in the vicinity of the wavelength of the input light. However, when it comes to a nonlinear optical fiber, in which it is difficult to adjust the zero dispersion wavelength, it is laborious to manufacture a plurality of different kinds of optical fiber differing from each other in the zero dispersion wavelength corresponding to the wavelength of the input light for carrying out optical signal processing of, for example, the wavelength multiplex transmission light.

BRIEF SUMMARY OF THE INVENTION

An object of the present invention is to provide a practical nonlinear dispersion-shifted optical fiber, which is suitable for wavelength conversion or optical signal processing utilizing nonlinear optical phenomena and which can be manufactured easily.

Another object of the present invention is to provide an optical signal processing apparatus using the optical fiber noted above.

Further, still another object of the present invention is to provide a wavelength converter using the optical fiber noted above.

According to a first aspect of the present invention, there is provided a nonlinear dispersion-shifted optical fiber, wherein a chromatic dispersion at a wavelength of 1550 nm is equal to a set value required for optical signal processing utilizing a nonlinear phenomenon, a dispersion slope at a wavelength of 1550 nm falls within a range of 0.001 to 0.1 $ps/nm^2/km$, a margin of fluctuation of the chromatic dispersion in a longitudinal direction of the optical fiber at a wavelength of 1550 nm falls within a range of 0.01 to 3 ps/nm/km, and a nonlinear constant $n_2/A_{eff}$ at a wavelength of 1550 nm is not smaller than $15 \times 10^{-10}$/W.

According to a second aspect of the present invention, there is provided a nonlinear dispersion-shifted optical fiber, comprising a first core having a refractive index higher than that of a clad, a second core formed on a periphery of the first core and having a refractive index lower than that of a clad, and a clad formed on a periphery of the second core and having a refractive index substantially equal to that of pure silica, wherein an outer diameter D1 of the first core falls within a range of 3 to 8 $\mu$m, and a ratio D1/D2 of the outer diameter D1 of the first core to an outer diameter D2 of the second core falls within a range of 0.3 to 0.85.

According to a third aspect of the present invention, there is provided an optical signal processing apparatus comprising the nonlinear dispersion-shifted optical fiber noted above.

Further, according to a fourth aspect of the present invention, there is provided a wavelength converter comprising the nonlinear dispersion-shifted optical fiber noted above.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

DETAILED DESCRIPTION OF THE INVENTION

Figure 1A:
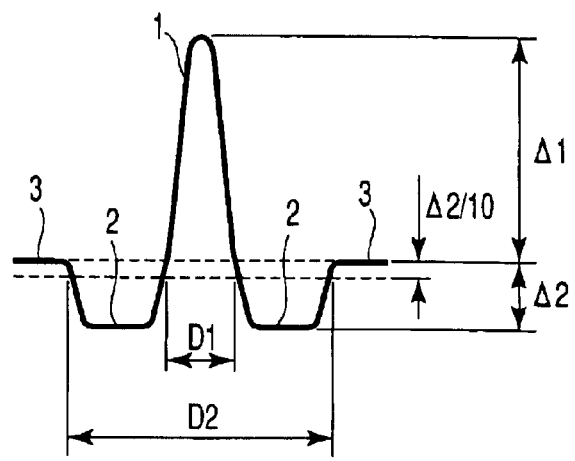
FIG. 1A exemplifies the refractive index profile of an optical fiber according to one embodiment of the present invention.

A nonlinear dispersion-shifted optical fiber according to a first aspect of the present invention is such that the chromatic dispersion at a wavelength of 1550 nm is equal to the set value required for optical signal processing utilizing a nonlinear phenomenon, the dispersion slope at a wavelength of 1550 nm falls within a range of 0.001 to 0.1 ps/nm$^2$/km, the margin of fluctuation of the chromatic dispersion in the longitudinal direction of the optical fiber at a wavelength of 1550 nm falls within a range of 0.01 to 3 ps/nm/km, and the nonlinear constant $n_2/A_{eff}$ at a wavelength of 1550 nm is not smaller than 15×10$^{-10}$/W.

The margin of fluctuation of the chromatic dispersion referred in this specification denotes the margin of fluctuation of the chromatic dispersion measured by a measuring device for the distribution of the chromatic dispersion over the entire length of an optical fiber having a practical length. It is possible to measure the distribution of the chromatic dispersion in the longitudinal direction of the optical fiber by a dispersion distribution measuring device utilizing a system studied by, for example, Mollenauer. As examples of specific measuring instruments, there is cited Measuring Instrument for Distribution of chromatic Dispersion AQ7510, AQ7511 made in Ando Electric Inc. and Dispersion OTDR Q8480 made in Advantest Inc.

In the nonlinear dispersion-shifted optical fiber according to the first embodiment of the present invention, it is desirable for the dispersion slope to fall within a range of 0.001 to 0.029 ps/nm$^2$/km. Also, it is desirable for the margin of fluctuation of the chromatic dispersion in the longitudinal direction of the optical fiber at a wavelength of 1550 nm to fall within a range of 0.3 to 3 ps/nm/km.

In the nonlinear dispersion-shifted optical fiber according to the first embodiment of the present invention, it is desirable for the cut-off wavelength to be not longer than 1350 nm and for the mode field diameter to be not larger than 4.5 μm. Further, it is desirable for the change of the chromatic dispersion at a wavelength of 1550 nm to be not larger than 0.006 ps/nm/km when the temperature of the optical fiber is changed by 10° C. Still further, it is desirable for the absolute value of the chromatic dispersion at a wavelength of 1550 nm to be not larger than 6 ps/nm/km.

It is also desirable for the relative refractive index difference Δ1 between the first core and the clad to fall within a range of 1.6 to 3% and for the relative refractive index difference Δ2 between the second core and the clad to fall within a range of −1 to −0.1%, more desirably −1 to −0.5%. Further, it is possible for the refractive index profile of the first core to be shaped like an a exponential profile, in which a is 3.0 or more.

The relative refractive index differences Δ1 and Δ2 noted above are defined by formulas (1) and (2) given below in the present specification:

$$\Delta 1 = \{(n_f - n_0)/n_f\} \times 100 \quad (1)$$

$$\Delta 2 = \{(n_s - n_0)/n_s\} \times 100 \quad (2)$$

where $n_f$ represents the refractive index of that portion of the first core which has the maximum refractive index, $n_s$ represents the refractive index of that portion of the second core which has the minimum refractive index, and $n_0$ represents the refractive index of the clad.

It is possible to form a stress imparting mechanism for imparting a stress in the optical fiber of the present invention. It is also possible to form a carbon layer or a silicon carbide layer on the periphery of the clad included in the optical fiber of the present invention.

The nonlinear dispersion-shifted optical fiber according to the first aspect of the present invention is a nonlinear dispersion-shifted optical fiber which generates a nonlinear phenomenon to input light having a wavelength in the vicinity of 1550 nm. One of the features of the nonlinear dispersion-shifted optical fiber according to the first aspect of the present invention resides in that the dispersion slope at a wavelength of 1550 nm falls within a range of 0.001 to 0.1 ps/nm$^2$/km. Where the dispersion slope is not larger than 0.1 ps/nm$^2$/km, as in the present invention, it is possible to provide an optical fiber having a small fluctuation in the dispersion value of the wavelength relative to a different wavelength in the vicinity of the wavelength of 1550 nm, e.g., to provide an optical fiber having a small absolute value of the chromatic dispersion relative to the various wavelengths in the vicinity of the wavelength of 1550 nm by a single kind of a fiber.

It is also possible to carry out optical signal processing utilizing the nonlinear phenomenon in various wavelengths by using a single fiber without markedly changing the dispersion value even if the wavelength of the input light is changed. Also, where the dispersion slope is not larger than 0.1 ps/nm$^2$/km, it is possible to carry out satisfactory optical signal processing utilizing the nonlinear optical phenomenon. It is desirable for the dispersion slope to be not smaller than 0.001 ps/nm$^2$/km. The dispersion slope is determined in balance with the other characteristics of the fiber. It is difficult to design and manufacture an optical fiber having a dispersion slope smaller than 0.001 ps/nm$^2$/km if it is intended to allow the optical fiber to have a chromatic dispersion having a small absolute value in the vicinity of the wavelength of 1550 nm and a small mode field diameter, and if the cut-off wavelength is adjusted to exhibit a single mode in the vicinity of the wavelength of 1550 nm. Under the circumstances, it is desirable for the dispersion slope to be not smaller than 0.001 ps/nm$^2$/km.

It is desirable for the dispersion slope to fall within a range of 0.001 to 0.029 ps/nm$^2$/km, more desirably 0.001 to 0.019 ps/nm$^2$/km.

Also, it is desirable for the margin of fluctuation in the chromatic dispersion in the longitudinal direction of the fiber at the wavelength of 1550 nm to fall within a range of 0.01 to 3 ps/nm/km. Where the margin of fluctuation in the chromatic dispersion in the longitudinal direction of the fiber is not larger than 3 ps/nm/km, it is possible to carry out satisfactory optical signal processing utilizing the nonlinear optical phenomenon. Also, where the margin of fluctuation in the chromatic dispersion in the longitudinal direction of the fiber is not larger than 3 ps/nm/km, the difference in the chromatic dispersion is small in any portion of the fiber in the case where the optical fiber is divided by cutting the optical fiber. In addition, since the dispersion slope is small, it is possible to obtain the merit that the difference in the dispersion value is small even if the divided optical fibers are used for input lights having various wavelengths in the vicinity of 1550 nm.

On the other hand, in order to permit the margin of fluctuation in the chromatic dispersion in the longitudinal direction of the fiber to be smaller than 0.01 ps/nm/km, it is necessary to obtain an optical fiber having high uniformity in the longitudinal direction of the optical fiber. It should be noted in this connection that, in the nonlinear dispersion-shifted optical fiber having a small core diameter and having the relative refractive index difference A of the core increased so as to diminish the mode field diameter, it is very difficult to suppress the fluctuation of the chromatic dispersion in the longitudinal direction to a value smaller than 0.01 ps/nm/km. It follows that it is unavoidable to manufacture a large number of optical fibers and to select from among the manufactured optical fibers satisfactory portions small in the change of the core diameter. Naturally, the productivity is very poor in this case.

For example, in the optical fiber having the structure in Example 2 referred to herein later, in order to suppress the fluctuation in the chromatic dispersion in the longitudinal direction of the optical fiber to a value not larger than 0.01 ps/nm/km it is necessary to suppress the change of the diameter of the first core to a value not larger than 0.01%. Naturally, the productivity is very poor.

As described previously, it is necessary for the dispersion slope at a wavelength of 1550 nm to fall within a range of 0.001 to 0.1 ps/nm$^2$/km. It is also necessary for the margin of fluctuation of the chromatic dispersion in the longitudinal direction of the optical fiber at a wavelength of 1550 nm to fall within a range of 0.01 to 3 ps/nm/km. Only where these two requirements are satisfied simultaneously is made it possible to carry out satisfactory optical signal processing utilizing a nonlinear optical phenomenon relative to various wavelengths in the vicinity of 1550 nm and to manufacture satisfactorily the nonlinear dispersion-shifted optical fiber. In addition, the total cost performance can be improved.

Further, it is desirable for the margin of fluctuation of the chromatic dispersion in the longitudinal direction of the optical fiber to fall within a range of 0.3 to 3 ps/nm/km at a wavelength of 1550 nm. If the margin of fluctuation of the chromatic dispersion in the longitudinal direction of the optical fiber is not smaller than 0.3 ps/nm/km, the allowable range of the change of the core diameter in the longitudinal direction of the optical fiber is widened. As a result, the productivity is further improved. In addition, in the signal processing utilizing a nonlinear optical phenomenon other than wavelength conversion utilizing four wave mixing, it suffices for the margin of fluctuation of the chromatic dispersion in the longitudinal direction of the optical fiber to fall within a range of 0.3 to 3 ps/nm/km.

It is possible for the margin of fluctuation of the chromatic dispersion in the longitudinal direction of the optical fiber having a length not larger than 5 km to fall within a range of between 0.01 and 0.2 ps/nm$^2$/km. Where the length of the optical fiber is not larger than 5 km, the productivity is not lowered even if the margin of fluctuation of the chromatic dispersion is set not to exceed 0.2 ps/nm$^2$/km. Also, if the margin of fluctuation of the chromatic dispersion is not to exceed 0.2 ps/nm$^2$/km, it is possible to perform satisfactorily wavelength conversion utilizing four wave mixing.

Also, it is desirable for the cut-off wavelength to be not larger than 1350 nm. Where the cut-off wavelength is not larger than 1350 nm, it is possible to use the optical fiber over a wide band including the S and C bands.

For example, it is desirable to construct the optical fiber such that a second core having a refractive index lower than that of the clad is arranged to surround the periphery of a first core, and that the ratio D1/D2 of the outer diameter D1 of the first core to the outer diameter D2 of the second core and the absolute value of the chromatic dispersion are set to fall within prescribed ranges. Where the optical fiber is constructed as described above, it is possible to obtain simultaneously a low cut-off wavelength not longer than 1350 nm, a high nonlinear constant not lower than $15 \times 10^{-10}$/W, and a small dispersion slope not larger than 0.029 ps/nm$^2$/km.

It is desirable for the mode field diameter to be not larger than 4.5 μm. If the mode field diameter is set to be not larger than 4.5 μm, it is possible to obtain a high nonlinear constant. In order to increase the nonlinear constant, which is represented by $n_2/A_{eff}$, it is necessary to increase the nonlinear refractive index $n_2$ or to decrease the effective core area $A_{eff}$. Incidentally, the effective core area $A_{eff}$ has a positive correlation with the mode field diameter.

It is possible to obtain a high nonlinear constant by setting the mode field diameter at a level not higher than 4.5 μm. A small mode field diameter can be obtained by increasing the relative refractive index difference between the core and the clad. However, if the relative refractive index difference between the core and the clad is simply increased, the cut-off wavelength is shifted toward the side of the longer wavelength, making it difficult to ensure the single mode transmission over a wide band. On the other hand, in the case of employing the construction recited in, for example, claim 6, it is possible to obtain both a small mode field diameter and a low cut-off wavelength.

Further, it is desirable for the change of the chromatic dispersion at a wavelength of 1550 nm to be not larger than 0.006 ps/nm/km when the temperature of the optical fiber is changed by 10° C. Where wavelength conversion is carried out by, for example, four wave mixing, the conversion efficiency is maximized when the wavelength of a pumping light coincides with the zero dispersion wavelength of the optical fiber. However, the conversion efficiency is lowered if the wavelength of a pumping light is deviated, even if slightly, from the zero dispersion wavelength of the optical fiber. If the dispersion characteristics of the optical fiber are changed with temperature, a problem is generated that the conversion efficiency is made unstable by the environmental temperature.

Where the change of the chromatic dispersion at a wavelength of 1550 nm is not larger than 0.006 ps/nm/km when the temperature of the optical fiber is changed by 10° C., it is possible to obtain a conversion efficiency that is stable within a practical temperature range. As described previously, a second core having a refractive index lower than that of the clad is formed on the periphery of a first core. In the present invention, the ratio D1/D2 of the outer diameter D1 of the first core to the outer diameter D2 of the second core and the absolute value of the chromatic dispersion are set to fall within prescribed ranges. Also, the relative refractive index difference Δ1 and the relative refractive index difference Δ2 are set to fall within prescribed ranges. It is desirable to construct the optical fiber as described above because the particular construction permits facilitating the manufacture of an optical fiber in which the change of the chromatic dispersion at a wavelength of 1550 nm is suppressed to 0.006 ps/nm/km or less when the temperature of the optical fiber is changed by 10° C.

The nonlinear dispersion-shifted optical fiber according to the second aspect of the present invention comprises a first core having a refractive index higher than that of a clad, a second core formed on the periphery of said first core and having a refractive index lower than that of a clad, and a clad formed on the periphery of said second core and having a refractive index substantially equal to that of pure silica, wherein the outer diameter D1 of said first core falls within a range of 3 to 8 μm, and the ratio D1/D2 of the outer diameter D1 of said first core to the outer diameter D2 of said second core falls within a range of 0.3 to 0.85.

In the nonlinear dispersion-shifted optical fiber according to the second aspect of the present invention, it is desirable for the ratio D1/D2 of the outer diameter D1 of the first core to the outer diameter D2 of the second core to fall within a range of 0.3 to 0.80. It is also desirable for the absolute value of the chromatic dispersion at a wavelength of 1550 nm to be not larger than 6 ps/nm/km.

Also, it is desirable for the relative refractive index difference Δ1 between the first core and the clad to fall within a range of 1.6 to 3% and for the relative refractive index difference Δ2 between the second core and the clad to fall within a range of −1 to 0.1%, more desirably −1 to −0.5.

Further, it is desirable for the refractive index profile of the first core to be shaped like an a exponential profile, in which a is 3.0 or more. Also, it is possible for the optical fiber to include a stress imparting mechanism for imparting a stress to the optical fiber and a carbon layer or a silicon carbide layer formed on the periphery of the clad included in the optical fiber as in the optical fiber according to the first aspect of the present invention.

Various embodiments of the present invention will now be described with reference to the accompanying drawings.

FIG. 1A exemplifies the refractive index profile of the optical fiber according to one embodiment of the present invention. As shown in FIG. 1A, the optical fiber according to one embodiment of the present invention comprises a first core 1 having a refractive index higher than that of a clad 3, a second core 2 formed on the periphery of the first core 1 and having a refractive index lower than that of the clad 3, and the clad 3 formed on the periphery of the second core 2 and having a refractive index equal or close to that of pure silica.

Figure 2:
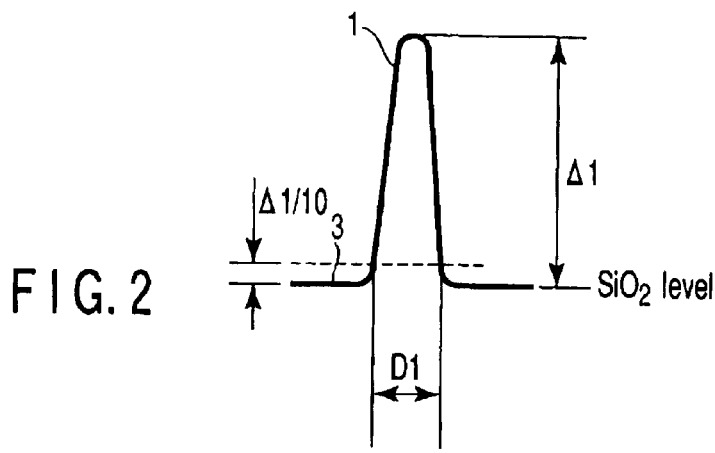
FIG. 2 exemplifies the refractive index profile of an optical fiber according to another embodiment of the present invention.

FIG. 2 exemplifies the refractive index profile of an optical fiber according to another embodiment of the present invention. As shown in FIG. 2, in the optical fiber according to this embodiment, the second core 2 shown in FIG. 1A is omitted so as to permit the clad to be formed directly on the periphery of the first core 1. It should be noted that the optical fiber according to the embodiment shown in FIG. 1A is more desirable than the optical fiber according to the embodiment shown in FIG. 2 because, if the refractive index profile of the optical fiber is of W type as shown in FIG. 1A, it is possible to obtain easily an optical fiber having high nonlinearity and a low dispersion slope, making it possible to widen the design range of the outer diameter of the first core and the outer diameter of the second core of the optical fiber.

Incidentally, the first core diameter D1 and the second core diameter D2 shown in FIGS. 1A and 2 can be determined as follows.

It should be noted that the first core diameter D1 shown in FIG. 1A is equal to the outer diameter of that portion of the first core 1 which has a refractive index equal to that of the clad 3. Also, the second core diameter D2 is equal to the outer diameter of that portion of the boundary region between the second core 2 and the clad 3 which has a refractive index of Δ2/10. Further, the core diameter D1 shown in FIG. 2 is equal to the outer diameter of that portion of the first core portion 1 which has a refractive index of Δ1/10.

The first core 1 is formed of a germanium-doped silica glass, the second core 2 is formed of a fluorine-doped silica glass, and the clad 3 is formed of pure silica. The outer diameter D1 of the first core falls within a range of 3 to 8 μm. Also, in the structure shown in FIG. 1A, the ratio D1/D2 of the outer diameter D1 of the first core to the outer diameter D2 of the second core falls within a range of 0.3 to 0.85, preferably between 0.3 and 0.80. In this case, it is desirable for the absolute value of the chromatic dispersion at a wavelength of 1550 nm to be not larger than 6 ps/nm/km.

In the embodiment described above, it is desirable for the relative refractive index difference Δ1 between the first core and the clad to fall within a range of 1.6 to 3%, more desirably 1.8 to 2.9%. Also, in the structure shown in FIG. 1A, it is desirable for the relative refractive index difference Δ2 between the second core and the clad to fall within a range of −1 to −0.1%, more desirably −1 to −0.5%.

It is possible for the refractive index profile of the first core to be shaped like an a exponential profile, in which a is 3.0 or more, preferably 4.0 or more. Also, it is desirable for the nonlinear constant at a wavelength of 1550 nm to be not smaller than $15 \times 10^{-10}$/W.

Figure 1B:
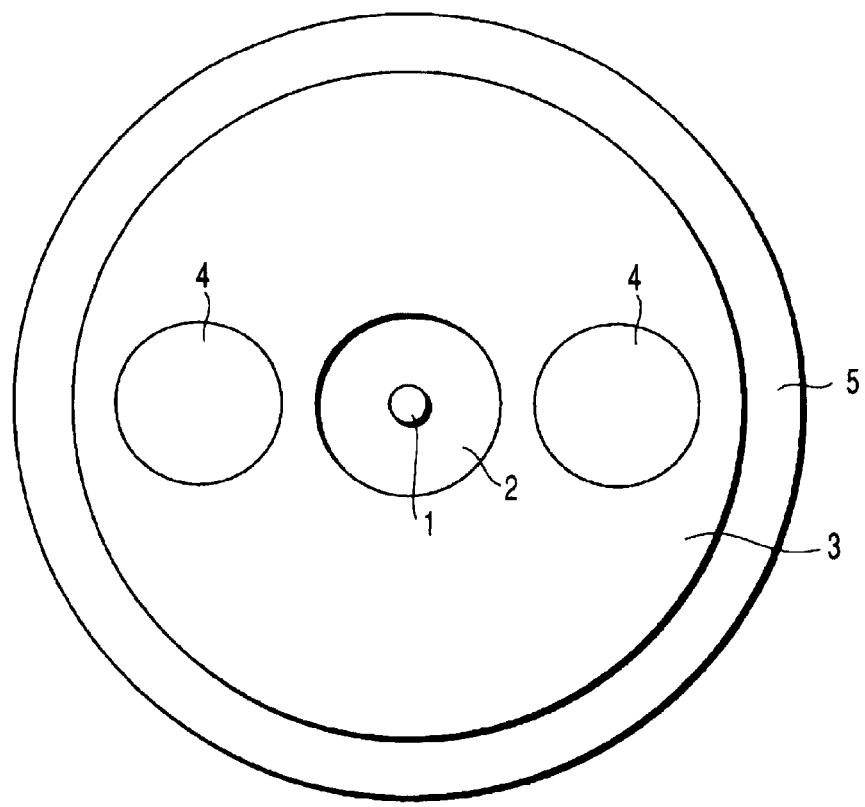
FIG. 1B is a cross sectional view of the optical fiber shown in FIG. 1A.

FIG. 1B exemplifies the cross sectional view of the optical fiber shown in FIG. 1A. As shown in FIG. 1B, a stress imparting part 4 for imparting a stress is buried in the clad 3. The stress imparting parts 4, which are formed of a silica glass containing $B_2O_3$, are arranged on both sides in a manner to have the first core 1 and the second core 2 interposed therebetween.

The nonlinear optical phenomenon is greatly affected by the state of polarization. Therefore, in order to carry out satisfactory optical signal processing utilizing the nonlinear optical phenomenon, it is desirable to use an optical fiber performing the function of maintaining the polarization. Under the circumstances, the stress imparting parts are formed in the optical fiber according to this embodiment so as to provide an optical fiber maintaining the polarization.

Also, as shown in FIG. 1B, a protective layer 5 consisting essentially of carbon or silicon carbide is formed on the periphery of the clad 3. The protective layer 5 functions as a hermetic coating that makes it possible to suppress the progress of the fatigue and to prevent the permeation of water even if the optical fiber is exposed to water or to a high humidity environment for a long time.

Further, in the optical fiber according to this embodiment, the dispersion slope at a wavelength of 1550 nm falls within a range of 0.001 to 0.1 ps/nm²/km, preferably 0.001 to 0.029 ps/nm²/km, and more preferably 0.001 to 0.019 ps/nm²/km, and the margin of fluctuation of the chromatic dispersion in the longitudinal direction of the optical fiber at a wavelength of 1550 nm falls within a range of 0.01 to 3 ps/nm/km, preferably 0.3 to 3 ps/nm/km.

Incidentally, the processing efficiency of the optical signal processing utilizing the nonlinear optical phenomenon is improved when a desired dispersion value is exhibited under the wavelength used. For example, in wavelength conversion utilizing four wave mixing, it is optimum for the chromatic dispersion to be zero under the wavelength of a pumping light. On the other hand, in the waveform rectification called optical 2R and optical 3R, the desired chromatic dispersion differs depending on the specific system used. Incidentally, the "optical 2R" represents "Regenerating" and "Reshaping", and the "optical 3R" represents the optical 2R and "Retiming".

The nonlinear phase deviation $\Phi_{NL}$, which is a parameter denoting the nonlinear characteristics, is represented by formula (3) given below:

$$\Phi_{NL} = (2/\lambda) \cdot (n_2/A_{eff}) \cdot I/L_{eff} \qquad (3)$$

where $n_2$ represents the nonlinear refractive index, $A_{eff}$ represents the effective core area, I represents the intensity of light, and $L_{eff}$ represents the effective length of the optical fiber.

As apparent from formula (3) given above, a high nonlinear function can be obtained if the optical fiber is long. However, in the case of using a long optical fiber, the inner volume of the nonlinear optical fiber inside the optical signal processing apparatus utilizing the nonlinear phenomenon is increased so as to make it difficult to downsize the optical signal processing apparatus utilizing the nonlinear phenomenon. It follows that it is required for the nonlinear optical fiber used in the optical signal processing apparatus utilizing the nonlinear phenomenon to exhibit high nonlinearity even if the optical fiber is made as short as possible. In other words, formula (3) given above indicates that the value of $n_2/A_{eff}$ (nonlinear constant) should be as large as possible. The nonlinear refractive index $n_2$ is determined by the material. Concerning the construction of the optical fiber, the value of $A_{eff}$ is required to be as small as possible. It should be noted that the effective core area $A_{eff}$ has a positive correlation to the mode field diameter.

It follows that, in order to obtain an optical fiber having high nonlinearity, the optical fiber is required to be constructed to have a small mode field diameter. It is also required for the absolute value of the chromatic dispersion under the wavelength used to be small. Further, in the single mode optical fiber, the cut-off wavelength is required to be short in accordance with the wavelength used.

In view of the situation described above, the optical fiber according to one embodiment of the present invention is of a W-type refractive index profile as shown in FIG. 1A, and the optical fiber according to another embodiment of the present invention is of a single ridge type refractive index profile as shown in FIG. 2.

It is desirable for the outer diameter D1 of the first core to fall within a range of 3 to 8 μm. In the case of using a silica-based glass, the first core diameter that permits diminishing the absolute value of the chromatic dispersion at 1550 nm falls within a first range in which the core diameter is shorter than 3 μm or a second range in which the core diameter falls within a range of 3 to 8 μm. However, in the first range in which the core diameter is shorter than 3 μm, the dispersion value is greatly changed even by a small change in the core diameter so as to make it difficult to obtain an optical fiber having a high uniformity of the chromatic dispersion in the longitudinal direction of the optical fiber. In addition, the cut-off wavelength exceeds 1550 nm. Naturally, it is undesirable for the first core diameter to fall within the first range in which the core diameter is shorter than 3 μm.

It is desirable for the ratio D1/D2 of the outer diameter D1 of the first core to the outer diameter D2 of the second core to fall within a range of 0.3 to 0.85, more desirably 0.3 to 0.80. Where the ratio D1/D2 falls within the range noted above, it is possible to diminish the absolute value of the chromatic dispersion at a wavelength of 1550 nm and, at the same time, to diminish the dispersion slope at a wavelength of 1550 nm.

Further, it is desirable for the relative refractive index difference Δ1 between the first core and the clad to fall within a range of 1.6 to 3% and for the relative refractive index difference Δ2 between the second core and the clad to fall within a range of −0.1 to −1%.

Where the relative refractive index difference Δ1 between the first core and the clad is smaller than 1.6%, the mode field diameter is large. As a result, nonlinearity is lowered. On the other hand, where the relative refractive index difference Δ1 noted above exceeds 3%, the cut-off wavelength exceeds 1550 nm, with the result that the consideration for the cut-off wavelength for making the optical fiber operable under the single mode is increased. As a result, the productivity is made poor. Also, the outer diameter of the first core is made excessively small when it is intended to diminish the absolute value of the chromatic dispersion at a wavelength of 1550 nm. As a result, the chromatic dispersion is greatly changed even by a small change in the core diameter. It follows that it is difficult to obtain an optical fiber having a high uniformity of the chromatic dispersion in the longitudinal direction of the optical fiber.

It is more desirable for the relative refractive index difference Δ1 noted above to fall within a range of 1.8 to 2.9%. Where the relative refractive index difference Δ1 falls within the range noted above, it is possible to manufacture an optical fiber having high nonlinearity and a high uniformity of the chromatic dispersion in the longitudinal direction.

If the relative refractive index difference Δ2 between the second core and the clad is larger than −0.1%, the dispersion slope is made small when it is intended to diminish the absolute value of the chromatic dispersion at a wavelength of 1550 nm, making it difficult to design the optical fiber. On the other hand, if the relative refractive index difference Δ2 noted above is smaller than −1%, it is necessary for the optical fiber to be doped with a large amount of, for example, fluorine, making it difficult to manufacture an optical fiber.

It is more desirable for the relative refractive index difference Δ2 to fall within a range of −1 to −0.5%. If the relative refractive index difference Δ2 falls within the range noted above, it is possible to achieve a low dispersion slope and to manufacture an optical fiber easily.

Also, the relative refractive index difference Δ2 fallen within a range of −1.2 to −0.9% makes the cutoff wavelength shorter and the dispersion slope lower even if the relative refractive index difference Δ1 is made greater. The optical fiber preform, in which the relative refractive index difference Δ2 fall not large than −0.9%, is obtained by sintering the $SiO_2$ soot body formed with Vapour Phase Deposition Method under a pressurized atmosphere including fluorine.

Furthermore, it is desirable, for the relative refractive index difference Δs1 between the first core and pure silica to fall within a range of 1.6 to 3%, for the relative refractive index difference Δs2 between the second core and pure silica to fall within a range of −1.2 to −0.9% and for the relative refractive index difference Δs3 between the clad and pure silica to fall within a range of −0.7 to −0.1%. The relative refractive index differences Δs1, Δs2 and Δs3 are defined by formulas (4), (5) and (6) given below in the present specification:

$$\Delta s1 = \{(n_f - n_p)/n_f\} \times 100 \qquad (4)$$

$$\Delta s2 = \{(n_s - n_p)/n_s\} \times 100 \qquad (5)$$

$$\Delta s3 = \{(n_0 - n_p)/n_0\} \times 100 \qquad (6)$$

where $n_p$ represents the refractive index of pure silica.

It should also be noted that, where the nonlinear constant $n_2/A_{eff}$ is not smaller than $15 \times 10^{-10}$/W, it is possible to obtain high nonlinearity.

EXAMPLES

Tables 1 and 2 show the relationship between the design values obtained by simulation calculation of the waveguide characteristics and the characteristic values in respect of various samples (Examples 1 to 6 and Comparative Examples 1 to 4) of the nonlinear dispersion-shifted optical fiber.

Table 3 and 4 show the refractive index profiles and the characteristic values of Examples 1, 2, 7 to 10 which are obtained as a result of experimental manufacture. The refractive index profiles and the characteristic values of Example 1 and Example 2 shown in Table 3 and Table 4 are obtained with respect to the fibers actually manufactured based upon the design values of Example 1 and Example 2 shown in Table 1.

Each of Examples 1, 2, 4 to 7, 9, 10 and Comparative Examples 1 to 3 is directed to an optical fiber including a first core, a second core and a clad and exhibiting the refractive index profile shown in FIG. 1A. On the other hand, each of Examples 3, 8 and Comparative Example 4 is directed to an optical fiber including a single core and a clad and exhibiting the refractive index profile shown in FIG. 2.

As apparent from Tables 1 and 2, the optical fiber for each of Examples 1 to 6 has a small absolute value of the chromatic dispersion under the wavelength of 1550 nm, is small in the dispersion slope, and is small in the mode field diameter. Furthermore, as apparent from Tables 3 and 4, the same noted above is also true of Example 7 to 10.

Where the dispersion slope is small, it is possible to carry out satisfactory signal processing utilizing the nonlinearity, and it is also possible to cope with various wavelengths in the vicinity of 1550 nm. Also, where the mode field diameter is small, the nonlinearity can be increased so as to provide an excellent optical fiber.

The chromatic dispersion at 1550 nm is dependent on the core diameter. The absolute value of the chromatic dispersion can be certainly diminished even by the core diameter of the optical fiber for Comparative Example 4. However, the nonlinearity is diminished because the mode field diameter is large. Also, as apparent from comparison between Comparative Example 1 and Comparative Example 3 in Table 1 and 2, the dispersion is greatly changed, i.e., changed by about 20 ps/nm/km, by the change in the first core diameter by about 0.1 μm, making it difficult to obtain an optical fiber in which the margin of fluctuation of the chromatic dispersion in the longitudinal direction of the optical fiber is not larger than 3 ps/nm/km.

On the other hand, the comparison between Example 1 and Example 5 in Table 1 and 2 supports that, even if the first core diameter is changed by about 0.1 μm, the change of dispersion is only about 2 ps/nm/km, and that, if the first core diameter is not smaller than 3 μm, it is possible to obtain an optical fiber having a high uniformity of the chromatic dispersion in the longitudinal direction of the optical fiber even if the core diameter is slightly changed in the longitudinal direction of the optical fiber.

Also, the comparison between Example 1 and Example 3 in Table 1 and 2 supports that the optical fiber for Example 1 employing a W-type profile is superior to the optical fiber of a single ridge type for Example 3 in that the dispersion slope and the cut-off wavelength of the optical fiber for Example 1 are smaller than those of the optical fiber for Example 3.

Figure 3:
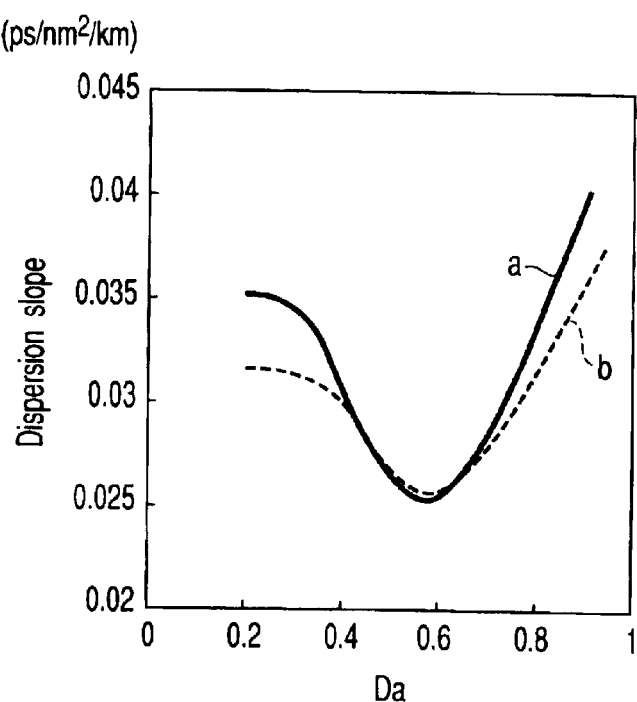
FIG. 3 is a graph showing the fluctuation in the dispersion slope in the case of changing the ratio Da=D1/D2 of the diameter D1 of the first core to the diameter D2 of the second core.

FIG. 3 is a graph showing the change of the dispersion slope relative to the change in the ratio Da, i.e., the ratio D1/D2, of the first core diameter D1 to the second core diameter D2, in respect of the optical fibers having the constructions of Example 1 and Example 2. In FIG. 3, the first core diameter D1 and the second core diameter D2 are adjusted to permit the chromatic dispersion at 1550 nm to be zero.

The first core diameter that permits diminishing the absolute value of the chromatic dispersion at 1550 nm falls within a first range in which the core diameter is not longer than 3 μm and within a second range in which the core diameter falls within a range of 3 to 8 μm. The dispersion slope shown in FIG. 3 covers the case where the chromatic dispersion at 1550 nm becomes zero within the second range in which the first core diameter falls within a range of 3 to 8 μm.

In FIG. 3, curve "a" covers an optical fiber having the construction of Example 2, and curve "b" covers an optical fiber having the construction of Example 1. As apparent from FIG. 3, the dispersion slope when the chromatic dispersion is set small is increased if the ratio Da exceeds 0.8. Clearly, it is desirable for the ratio Da to be not larger than 0.8. The graph of FIG. 3 also shows that, if the ratio Da is smaller than 0.3, the dispersion slope when the chromatic dispersion is set small is increased, supporting that it is desirable for the ratio Da to be not smaller than 0.3.

Where the optical fiber has the refractive index profile shown in FIG. 1A and where the ratio Da, i.e., the ratio D1/D2, is set to fall within a range of 0.3 to 0.8 with the value of D1 set to fall within a range of 3 to 8 μm, it is possible to permit the chromatic dispersion at, for example, 1550 nm to be zero and to permit the dispersion slope at this wavelength to be not larger than 0.035 ps/nm²/km.

The refractive index profiles and the characteristic values of Example 1 and Example 2 shown in Table 3 and Table 4 are obtained with respect to the fibers actually manufactured based upon the design values of Example 1 and Example 2 shown in Table 1. Furthermore, the refractive index profiles and the characteristic values of Example 9 and Example 10 shown in Table 3 and Table 4 are also obtained with respect to the fibers actually manufactured. The dispersion slope was found to be 0.016 ps/nm²/km for the obtained optical fiber for Example 1, 0.022 ps/nm²/km for the obtained optical fiber for Example 2, 0.010 ps/nm²/km for the obtained optical fiber for Example 9 and 0.014 ps/nm²/km for the obtained optical fiber for Example 10. The other characteristics of the obtained optical fibers were substantially equal to the values obtained by the simulation.

The dispersion slope of the actually manufactured optical fiber was found to be smaller by about 0.006 ps/nm²/km than the value obtained by the simulation. It should be noted that, where the optical fiber exhibits the refractive index profile shown in FIG. 1A and where the values of D1 and the ratio Da, i.e., the ratio D1/D2, are set to fall within the ranges noted above, it is possible to permit the chromatic dispersion at, for example, 1550 nm to be zero and it is also possible to permit the dispersion slope at this wavelength to be not larger than 0.029 ps/nm²/km.

Incidentally, the value obtained by the simulation differs somewhat from the result of the actual manufacture. It should be noted in this connection that, in the actual manufacture of an optical fiber by the fiber drawing, the refractive index profile is somewhat changed from the design value by the diffusion of the dopant component. Also, the first core and the second core doped with germanium or fluorine differ from the clad made of pure silica or a material close to the pure silica in the softening temperature and the viscosity in the softening state. As a result, the first core and the second core differ from the clad in the solidifying rate in the fiber drawing step so as to give rise to a strain. It is considered reasonable to understand that the strain generation affects the characteristics of the actually manufactured optical fiber.

The distribution of the chromatic dispersion in the longitudinal direction of the optical fiber was measured in respect of the manufactured optical fiber. The margin of fluctuation of the chromatic dispersion was found to be about 0.7 ps/nm/km for the optical fiber for Example 1 and about 2.0 ps/nm/km for the optical fiber for Example 2. Also, the values of $n_2/A_{eff}$ denoting the nonlinearity were measured by an XPM method in respect of the manufactured optical fibers. In Table 4, the manufactured optical fibers were found to have high nonlinearity, i.e., about $33 \times 10^{-10}$/W for the optical fiber for Example 1 about $40 \times 10^{-10}$/W for the optical fiber for Example 2, about $55 \times 10^{-10}$/W for the optical fiber for Example 9 and about $62 \times 10^{-10}$/W for the optical fiber for Example 10.

Figure 4:
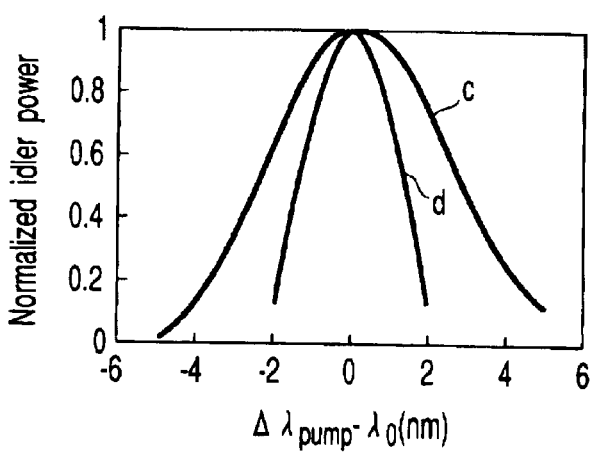
FIG. 4 is a graph showing the relationship between the pumping light wavelength and the power of the converted light.

Further, wavelength conversion test was applied to the manufactured optical fiber for Example 7 having a refractive index profile shown in FIG. 1A and to the manufactured optical fiber for Example 8 having a single ridge type refractive index profile shown in FIG. 2. FIG. 4 is a graph showing the results.

As shown in FIG. 4, the optical fiber for Example 7 having a small dispersion slope was found to have a tolerance of the pumping light wavelength ($\lambda_{pump}$), which is about twice as broad as that for the optical fiber for Example 8. This supports that the small dispersion slope is useful and that the refractive index profile structure shown in FIG. 1A is excellent. Incidentally, curve "c" in FIG. 4 denotes the experimental data in respect of wavelength conversion test for the optical fiber for Example 7, and curve "d" denotes the experimental data in respect of wavelength conversion test for the optical fiber for Example 8.

Wavelength conversion test was conducted by inputting a pumping light and a signal light to an optical fiber manufactured on the trial manufacture so as to measure the power of the converted light. The pumping light wavelength ($\lambda_{pump}$) and the signal light wavelength were changed while maintaining constant the difference between these two wavelengths. When the wavelength of the pumping light was set to fall within a range of ±3 nm of the zero dispersion wavelength $\lambda_0$, the power of the converted light was put in the maximum range.

As described above, it is possible to achieve the most efficient wavelength conversion when the wavelength ($\lambda_{pump}$) of the pumping light is allowed to be coincident with the zero dispersion wavelength ($\lambda_0$) of the optical fiber of the present invention, or when the wavelength ($\lambda_{pump}$) of the pumping light falls within a range of ±3 nm of the zero dispersion wavelength.

Also, the power of the converted light tends to be lowered based upon increase in the difference between the wavelength ($\lambda_{pump}$) of the pumping light and the zero dispersion wavelength ($\lambda_0$). However, in the case of using the optical fibers according to the Examples of the present invention, the power of the converted light don't severely diminish even if the wavelength ($\lambda_{pump}$) of the pumping light is made different from the zero dispersion wavelength ($\lambda_0$) of the optical fiber. In other words, the optical fiber according to the Example of the present invention produces the merit that it is possible to widen the set range (tolerance of the wavelength of the pumping light) of the wavelength ($\lambda_{pump}$) of the pumping light within which it is possible to obtain the converted light having at least a prescribed power. Particularly, it is desirable to use an optical fiber having a dispersion slope falling within a range of 0.001 to 0.029 ps/nm²/km because the set range of the wavelength ($\lambda_{pump}$) of the pumping light can be widened in the case of using the particular optical fiber.

Table 2 also shows the dependence of the chromatic dispersion on temperature in which the chromatic dispersion at a wavelength of 1550 nm was measured within a range of 0° C. to 40° C. in respect of the optical fibers manufactured by way of trial as Examples 7 and 8. As shown in Table 2, it is possible to obtain an optical fiber that is small in the change of the chromatic dispersion in spite of the change of temperature in the case of employing the structure having the refractive index profile shown in FIG. 1A.

TABLE 1

|  | First core Δ 1 % | Second core Δ 2 % | First core α value | First core diameter D1 μm | Core diameter ratio D1/D2 = Da | Second core diameter D2 μm | Clad material/outer diameter/μm |
| --- | --- | --- | --- | --- | --- | --- | --- |
| Example 1 | 2.0 | −0.55 | 4 | 4.45 | 0.57 | 7.8 | Silica/125 |
| Example 2 | 2.85 | −0.6 | 5.6 | 4.0 | 0.6 | 6.7 | Silica/125 |
| Example 3 | 2.55 | none | 4 | 4.5 | — | — | Silica/125 |
| Example 4 | 2.0 | −0.55 | 4 | 4.46 | 0.57 | 7.8 | Silica/125 |
| Example 5 | 2.0 | −0.55 | 4 | 4.56 | 0.57 | 8.0 | Silica/125 |
| Example 6 | 1.6 | −0.9 | 16 | 4.05 | 0.5 | 8.1 | Silica/125 |
| Comparative Example 1 | 2.0 | −0.55 | 4 | 1.94 | 0.57 | 3.4 | Silica/125 |
| Comparative Example 2 | 2.0 | −0.55 | 4 | 2.00 | 0.57 | 3.5 | Silica/125 |
| Comparative Example 3 | 2.0 | −0.55 | 4 | 2.05 | 0.57 | 3.6 | Silica/125 |
| Comparative Example 4 | 1.0 | none | 4 | 2.50 | — | — | Silica/125 |

TABLE 2

| | Nonlinear constant n2/Aeff ×10⁻¹⁰/W | Dispersion Ps/nm/km | Dispersion slop Ps/nm2/km | Cut off wavelength nm | Mode field diameter μm | Change in dispersion per change in temperature of 10° C. ps/nm/km/10° C. |
|---|---|---|---|---|---|---|
| Example 1 | — | −1.09 | 0.022 | 1201 | 4.14 | — |
| Example 2 | — | 0.62 | 0.026 | 1417 | 3.62 | — |
| Example 3 | — | −0.39 | 0.043 | 1542 | 4.04 | — |
| Example 4 | — | −1.08 | 0.023 | 1200 | 4.14 | — |
| Example 5 | — | 1.23 | 0.027 | 1232 | 4.17 | — |
| Example 6 | — | 0.61 | 0.0037 | 1097 | 4.09 | — |
| Comparative Example 1 | — | 12.18 | 0.225 | 541 | 43.4 | — |
| Comparative Example 2 | — | 3.92 | 0.318 | 555 | 30 | — |
| Comparative Example 3 | — | −8.09 | 0.411 | 570 | 21.7 | — |
| Comparative Example 4 | — | −0.18 | 0.412 | 548 | 15.9 | — |

TABLE 3

| | First core Δ 1 or Δ s1 % | Second core Δ 2 or Δ s2 % | First core α value | First core diameter D1 μm | Core diameter ratio D1/D2 = Da | Second core diameter D2 μm | Clad material/outer diameter/μm |
|---|---|---|---|---|---|---|---|
| Example 1 | 2.0 | −0.55 | 4 | 4.45 | 0.57 | 7.8 | Silica/125 |
| Example 2 | 2.85 | −0.6 | 5.6 | 4.0 | 0.6 | 6.7 | Silica/125 |
| Example 7 | 2.0 | −0.55 | 4 | 4.4 | 0.56 | 7.9 | Silica/125 |
| Example 8 | 2.55 | none | 4 | 4.6 | — | — | Silica/125 |
| Example 9 | 2.85 | −1 | 5.4 | 3.6 | 0.4 | 9.1 | Silica/125 |
| Example 10 | 2.85 | −1 | 5.3 | 3.6 | 0.4 | 9.1 | Δ 3 =− 0.3%/125 |

TABLE 4

| | Nonlinear constant n2/Aeff ×10⁻¹⁰/W | Dispersion Ps/nm/km | Dispersion slop Ps/nm2/km | Cut off wavelength nm | Mode field diameter μm | Change in Dispersion per change in temperature of 10° C. ps/nm/km/10° C. |
|---|---|---|---|---|---|---|
| Example 1 | 33 | −0.7 | 0.016 | 1206 | 4.2 | — |
| Example 2 | 40 | 0.8 | 0.022 | 1412 | 3.7 | — |
| Example 7 | 32 | 0.1 | 0.016 | 1200 | 4.2 | 0.0029 |
| Example 8 | 33 | 0.1 | 0.039 | 1510 | 4.3 | 0.0072 |
| Example 9 | 55 | 0.02 | 0.022 | 1218 | 3.4 | — |
| Example 10 | 62 | 0.03 | 0.027 | 1340 | 3.4 | — |

As described above in detail, according to the nonlinear dispersion-shifted optical fiber of the present invention, it is possible to carry out excellent optical signal processing utilizing a nonlinear phenomenon in respect of various wavelengths in the vicinity of 1550 nm. In addition, the present invention is excellent in the manufacturing capability of an optical fiber and, thus, is highly useful in the industry. For example, it is possible to carry out excellent optical signal processing utilizing a nonlinear phenomenon in respect of various wavelengths in the vicinity of 1550 nm by deviding a single optical fiber.

Also, the optical signal processing apparatus provided with the nonlinear dispersion-shifted optical fiber of the present invention is excellent in optical signal processing utilizing a nonlinear phenomenon. Further, the wavelength converter provided with the nonlinear dispersion-shifted optical fiber of the present invention is excellent in wavelength conversion utilizing a nonlinear phenomenon.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonlinear dispersion-shifted optical fiber, comprising:
an optical medium configured to have characteristics that include,
a dispersion slope at a wavelength of 1550 nm falls within a range of 0.001 to 0.1 ps/nm$^2$/km,
a margin of fluctuation of the chromatic dispersion in a longitudinal direction of the optical fiber at a wavelength of 1550 nm falls within a range of 0.01 to 3 ps/nm/km, and
a nonlinear constant $n_2/A_{\it{eff}}$ at a wavelength of 1550 nm is not smaller than $15 \times 10^{-10}$/W, wherein $n_2$ is a nonlinear refractive index and $A_{\it{eff}}$ is a effective core area.

2. The nonlinear dispersion-shifted optical fiber according to claim 1, wherein the dispersion slope at a wavelength of 1550 nm falls within a range of 0.001 to 0.029 ps/nm$^2$/km.

3. The nonlinear dispersion-shifted optical fiber according to claim 1, wherein the dispersion slope at a wavelength of 1550 nm falls within a range of 0.001 to 0.019 ps/nm$^2$/km.

4. The nonlinear dispersion-shifted optical fiber according to claim 1, wherein the margin of fluctuation of the chromatic dispersion in the longitudinal direction of the optical fiber within an optical fiber length of 5 km falls within a range of 0.01 to 0.2 ps/nm$^2$/km.

5. The nonlinear dispersion-shifted optical fiber according to claim 1, wherein a cut-off wavelength is not longer than 1350 nm, and a mode field diameter is not larger than 4.5 μm.

6. The nonlinear dispersion-shifted optical fiber according to claim 1, wherein change in the chromatic dispersion at a wavelength of 1550 nm is not larger than 0.006 ps/nm/km/10° C. when the temperature is changed by 10° C.

7. The nonlinear dispersion-shifted optical fiber according to claim 1, comprising a first core having a refractive index higher than that of a clad, a second core fanned on the periphery of said first core and having a refractive index lower than that of a clad, and a clad formed on the periphery of said second core and having a refractive index substantially equal to that of pure silica, wherein an outer diameter D1 of said first core falls within a range of 3 to 8 μm, and a ratio D1/D2 of the outer diameter D1 of said first core to an outer diameter D2 of said second core falls within a range of 0.3 to 0.85.

8. The nonlinear dispersion-shifted optical fiber according to claim 7, wherein refractive index profile of said first core is shaped like an α-exponential profile, with a being not smaller than 3.0.

9. The nonlinear dispersion-shifted optical fiber according to claim 7, wherein the ratio D1/D2 of the outer diameter D1 of said first core to the outer diameter D2 of said second core falls within a range of 0.3 to 0.8.

10. The nonlinear dispersion-shifted optical fiber according to claim 9, wherein refractive index profile of said first core is shaped like an a-exponential profile, with a being not smaller than 3.0.

11. The nonlinear dispersion-shifted optical fiber according to claim 7, wherein an absolute value of the chromatic dispersion at a wavelength of 1550 nm is not larger than 10 ps/nm/km.

12. The nonlinear dispersion-shifted optical fiber according to claim 11, wherein an absolute value of the chromatic dispersion at a wavelength of 1550 nm is not larger than 6 ps/nm/km.

13. The nonlinear dispersion-shifted optical fiber according to claim 7, wherein a relative refractive index difference Δ1 between said first core and a clad falls within a range of 1.6 to 3%, and a relative refractive index difference Δ2 between said second core and a clad falls within a range of −1 to −0.1%.

14. The nonlinear dispersion-shifted optical fiber according to claim 13, wherein the relative refractive index difference Δ2 between said second core and a clad falls within a range of −1 to −0.50.

15. The nonlinear dispersion-shifted optical fiber according to claim 14, wherein refractive index profile of said first core is shaped like an α-exponential profile, with α being not smaller than 3.0.

16. The nonlinear dispersion-shifted optical fiber according to claim 7, wherein a relative refractive index difference Δs1 between said first core and pure silica falls within a range of 1.6 to 30, and the relative refractive index difference Δs2 between said second core and pure silica falls within a range of −1.2 to −0.9.

17. The nonlinear dispersion-shifted optical fiber according to claim 16, wherein the relative refractive index difference Δs3 between said clad and pure silica falls within a range of −0.7 to −0.1.

18. The nonlinear dispersion-shifted optical fiber according to claim 17, wherein refractive index profile of said first core is shaped like an α-exponential profile, with α being not smaller than 3.0.

19. The nonlinear dispersion-shifted optical fiber according to claim 16, wherein the second core of the optical fiber preform for the optical fiber is obtained by sintering the $SiO_2$ soot body formed with Vapour Phase Deposition Method under a pressurized atmosphere including fluorine.

20. The nonlinear dispersion-shifted optical fiber according to claim 1, further comprising a stress imparting structure imparting a stress to the optical fiber.

21. The nonlinear dispersion-shifted optical fiber according to claim 1, comprising a carbon layer or a silicon carbide layer formed on the periphery of the clad of the optical fiber.

22. An optical signal processing apparatus comprising the nonlinear dispersion-shifted optical fiber recited in claim 1.

23. A optical signal processing apparatus according to claim 22, further comprising at least a light source for a pumping light, and functioning as a wavelength converter.

24. A wavelength converter according to claim 23, further comprising at least a light source for a pumping light, wherein a wavelength of the pumping light falls within a range of $(\lambda_{0-3})$ nm to $(\lambda_{0+3})$ nm, where $\lambda_0$ represents zero dispersion wavelength of the nonlinear dispersion-shifted optical fiber.

25. A wavelength converter according to claim 24, further comprising a light source for a pumping light, wherein a wavelength of the pumping light coincides with zero dispersion wavelength $\lambda_0$ of the nonlinear dispersion-shifted optical fiber.

26. A nonlinear dispersion-shifted optical fiber, comprising a first core having a refractive index higher than that of a clad, a second core formed on a periphery of said first core and having a refractive index lower than that of a clad, and a clad formed on a periphery of said second core and having a refractive index substantially equal to that of pure silica, wherein an outer diameter D1 of said first core falls within a range of 3 to 8 μm, a ratio D1/D2 of the outer diameter D1 of said first core to an outer diameter D2 of said second core falls within a range of 0.3 to 0.85 and nonlinear constant at a wavelength of 1550 nm is not small than $15 \times 10^{-10}$/W.

27. The nonlinear dispersion-shifted optical fiber according to claim 26, wherein an absolute value of the chromatic dispersion at a wavelength of 1550 nm is not larger than 10 ps/nm/km.

28. The nonlinear dispersion-shifted optical fiber according to claim 27, wherein refractive index profile of said first core is shaped like an α-exponential profile, with α being not smaller than 3.0.

29. The nonlinear dispersion-shifted optical fiber according to claim 27, wherein the D1/D2 of the outer diameter D1 of said first core to the outer diameter D2 of said second core falls within a range of 0.3 to 0.80.

30. The nonlinear dispersion-shifted optical fiber according to claim 29, wherein refractive index profile of said first core is shaped like an α-exponential profile, with a being not smaller than 3.0.

31. The nonlinear dispersion-shifted optical fiber according to claim 27, wherein an absolute value of the chromatic dispersion at a wavelength of 1550 nm is not larger than 6 ps/nm/km.

32. The nonlinear dispersion-shifted optical fiber according to claim 31, wherein refractive index profile of said first core is shaped like an α-exponential profile, with α being not smaller than 3.0.

33. The nonlinear dispersion-shifted optical fiber according to claim 27, wherein a relative refractive index difference Δ1 between said first core and a clad falls within a range of 1.6 to 3%, and a relative refractive index difference Δ2 between said second core and a clad falls within a range of −1 to 0.1%.

34. The nonlinear dispersion-shifted optical fiber according to claim 33, wherein the relative refractive index difference Δ2 between said second core and a clad falls within a range of −1 to −0.50.

35. The nonlinear dispersion-shifted optical fiber according to claim 34, wherein refractive index profile of said first core is shaped like an α-exponential profile, with α being not smaller than 3.0.

36. The nonlinear dispersion-shifted optical fiber according to claim 27, wherein a relative refractive index difference Δs1 between said first core and pure silica falls within a range of 1.6 to 3%, and the relative refractive index difference Δs2 between said second core and pure silica falls within a range of −1.2 to −0.9.

37. The nonlinear dispersion-shifted optical fiber according to claim 36, wherein the relative refractive index difference Δs3 between said second clad and pure silica falls within a range of 0.7 to −0.1.

38. The nonlinear dispersion-shifted optical fiber according to claim 37, wherein refractive index profile of said first core is shaped like an α-exponential profile, with α being not smaller than 3.0.

39. The nonlinear dispersion-shifted optical fiber according to claim 36, wherein the second core of the optical fiber preform for the optical fiber is obtained by sintering the $SiO_2$ soot body formed with Vapour Phase Deposition Method under a pressurized atmosphere including fluorine.

40. The nonlinear dispersion-shifted optical fiber according to claim 27, further comprising a stress imparting structure imparting a stress to the optical fiber.

41. The nonlinear dispersion-shifted optical fiber according to claim 27, comprising a carbon layer or a silicon carbide layer formed on the periphery of the clad of the optical fiber.

42. An optical signal processing apparatus, comprising the nonlinear dispersion-shifted optical fiber recited in claim 27.

43. A optical signal processing apparatus according to claim 42, comprising the nonlinear dispersion-shifted optical fiber recited in claim 27 and at least a light source for a pumping light, and functioning as a wavelength converter.

44. A wavelength converter according to claim 43, comprising the nonlinear dispersion-shifted optical fiber recited in claim 27 and at least a light source for a pumping light, wherein a wavelength of the pumping light falls within a range of $(\lambda_{0-3})$ nm to $(\lambda_{0+3})$ nm, where $\lambda_0$ represents zero dispersion wavelength of the nonlinear dispersion-shifted optical fiber.

45. A wavelength converter according to claim 44, comprising the nonlinear dispersion-shifted optical fiber recited in claim 27 and at least a light source for a pumping light, wherein a wavelength of the pumping light coincides with zero dispersion wavelength $\lambda_0$ of the nonlinear dispersion-shifted optical fiber.

* * * * *